(12) United States Patent
Ohtsu

(10) Patent No.: US 6,847,438 B2
(45) Date of Patent: Jan. 25, 2005

(54) APPARATUS FOR INSPECTING SURFACE STRAIN OF MAGNETIC TAPE

(75) Inventor: Hiroki Ohtsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/673,457

(22) Filed: Sep. 30, 2003

(65) Prior Publication Data
US 2004/0066502 A1 Apr. 8, 2004

(30) Foreign Application Priority Data
Oct. 3, 2002 (JP) ........................................ 2002-291198

(51) Int. Cl.[7] ............................................. G01B 11/16
(52) U.S. Cl. ......................................................... 356/32
(58) Field of Search ............ 356/32–35.5, 237.1–237.3; 250/559.29, 559.39

(56) References Cited

U.S. PATENT DOCUMENTS 5,270,781 A * 12/1993 Singh et al. ................... 356/32
5,365,333 A * 11/1994 Wirth et al. ................. 356/244
6,118,132 A * 9/2000 Tullis ....................... 250/559.39

FOREIGN PATENT DOCUMENTS

JP          08-233560 A         9/1996

* cited by examiner

Primary Examiner—Michael P. Stafira
(74) Attorney, Agent, or Firm—Sughrue Mion, PLLC

(57) ABSTRACT

A tape surface strain inspecting apparatus which optically inspects a surface of a tape and surface strain of the tape is characterized by being provided with a light emitting device emitting a light on the surface of the tape and forming a linear image which slants at a predetermined angle for a tape width direction of the tape, an image taking device taking the image formed on the surface of the tape, an image inspecting means investigating an edge linearity of an image taken by said image taking device, and a strain discriminating means discriminating largeness of surface strain of the tape based on an inspection result by the image inspecting means.

20 Claims, 7 Drawing Sheets

APPARATUS FOR INSPECTING SURFACE STRAIN OF MAGNETIC TAPE

FIELD OF THE INVENTION

The present invention relates to an apparatus for inspecting surface strain of a magnetic tape, in particular, to the apparatus for inspecting the surface strain of the magnetic tape which can optically inspect the surface strain of the magnetic tape.

BACKGROUND OF THE INVENTION

A magnetic tape is composed of such a base layer consisting of PET (polyethylene terephthalate), a magnetic layer formed on one surface of the base layer, a back layer formed on the other surface of the base layer, and the like. Such the magnetic tape is required to show predetermined stable performance when data is recorded in or reproduced from it.

For example, during manufacturing the magnetic tape, if it is damaged and foreign particles floating in a manufacturing factory adhere to its surfaces, a recording magnetic force and reproducing output are lowered due to the damage and foreign particles in recording and reproducing, whereby an error so called a "dropout" that data cannot be correctly recorded or reproduced occurs.

Therefore, it is necessary to accurately grasp surface (surfaces of magnetic layer and back layer) states of the magnetic tape in order to manufacture a high quality magnetic tape which can show the predetermined stable performance. So conventionally, damage, grooves, and the like formed on the surfaces of the magnetic tape are optically inspected. For example, as such an inspection method, "Method and Apparatus for Inspecting Surface of Magnetic Recording Medium" is described in FIG. 1 of Japan patent laid open publication 8-233560.

"Method and Apparatus for Inspecting Surface of Magnetic Recording Medium" described in the above patent is intended to improve inspection accuracy by contriving an equipment arrangement of a light emitting device, camera, and the like, and it is described in "the method and apparatus" that when emitting linear detection lights on the magnetic layer surface of the magnetic tape and discriminating presence or absence of surface defects by receiving reflection lights of the detection lights by a CCD camera, an output level of system noise included in the detection lights can be decreased by making angles of emitting/receiving lights within a specific range and furthermore making a position of light axes of incident lights deviate from a reflection point.

However, with magnetic recording highly being densified these years, although the inspection accuracy of surface strain of the magnetic tape is furthermore required to be improved, there exists a problem that "Method and Apparatus for Inspecting Surface of Magnetic Recording Medium" described in the patent cannot accurately detect the surface strain of the magnetic tape.

SUMMARY OF THE INVENTION

An exemplary object of the present invention is to provide an apparatus for accurately inspecting surface strain of a magnetic tape.

A magnetic tape surface strain inspecting apparatus of the invention, which optically inspects a surface of a magnetic tape and detects surface strain of the magnetic tape, is characterized in that the apparatus is provided with a light emitting device which forms a linear image slanting at a predetermined angle for a tape width direction of the magnetic tape by emitting lights on the surface of the tape, an image taking device which takes the image formed on the surface of the tape, an image inspecting device which investigates an edge linearity of image taken by the image taking means, and a strain discriminating means which discriminates strain largeness on the surface of the tape based on an inspection result by the image inspecting means.

According to the apparatus, it emits lights on the surface of the magnetic tape and forms the linear image slanting at the predetermined angle for the tape width direction of the magnetic tape, takes the image by the image taking device, investigates the edge linearity of the image taken by the image inspecting means, and discriminates the strain largeness on the surface of the tape based on the inspection result by the strain discriminating means, whereby the surface strain of the magnetic tape can be inspected.

Another magnetic tape surface strain inspecting apparatus of the invention, which optically inspects a surface of a magnetic tape and detects surface strain of the magnetic tape, is characterized in that the apparatus is provided with a light emitting device which forms a plurality of linear images for a tape width direction of magnetic tape by emitting lights on the surface of the tape, an image taking device which takes the images formed on the surface of the tape, an image inspecting device which investigates an edge linearity of each image taken by the image taking means, and a strain discriminating means which discriminates strain largeness on the surface of the tape based on an inspection result by the image inspecting means.

According to the apparatus, it emits lights on the surface of the magnetic tape and forms a plurality of the linear images for the tape width direction of the magnetic tape, takes the images by the image taking device, investigates the edge linearity of each image taken by the image inspecting means, and discriminates the strain largeness on the surface of the tape based on the inspection result by the strain discriminating means, whereby the surface strain of the magnetic tape can be inspected.

BRIEF DESCRIPTION OF THE DRAWINGS

FIG. 3A shows a case that there exists no strain on a surface of a magnetic tape, whereas FIG. 3B shows another case that there exists strain on the surface of the magnetic tape.

FIG. 8A shows a case that there exists no strain on a surface of a magnetic tape; whereas FIG. 8B shows another case that there exists strain on the surface of the magnetic tape.

FIG. 10A is a histogram showing a dot accumulation of each image F2 in a tape width direction of the magnetic tape; and FIG. 10B is a histogram showing a dot accumulation of each image F2 in a tape running direction of the magnetic tape.

DESCRIPTION OF THE PREFERRED EMBODIMENTS

Hereinafter, the embodiments of the present invention will be described in detail, referring to drawings as needed. Here, a case (first embodiment) in which surface strain of a magnetic tape pulled out from a cartridge case of a magnetic tape cartridge is measured and another case (second embodiment) in which surface strain of a magnetic tape wound in a tape reel housed in a magnetic tape cartridge is measured will be described.

a. First Embodiment

Figure 2:
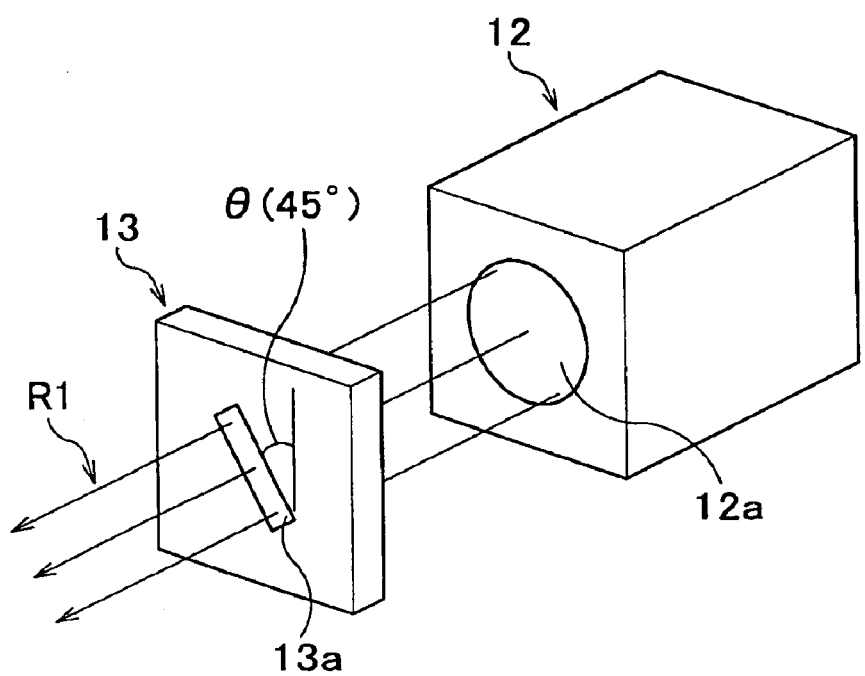
FIG. 2 is a perspective view showing a light emitting device 12 and light shielding plate 13 included in the inspecting apparatus 10.
Figure 3A:
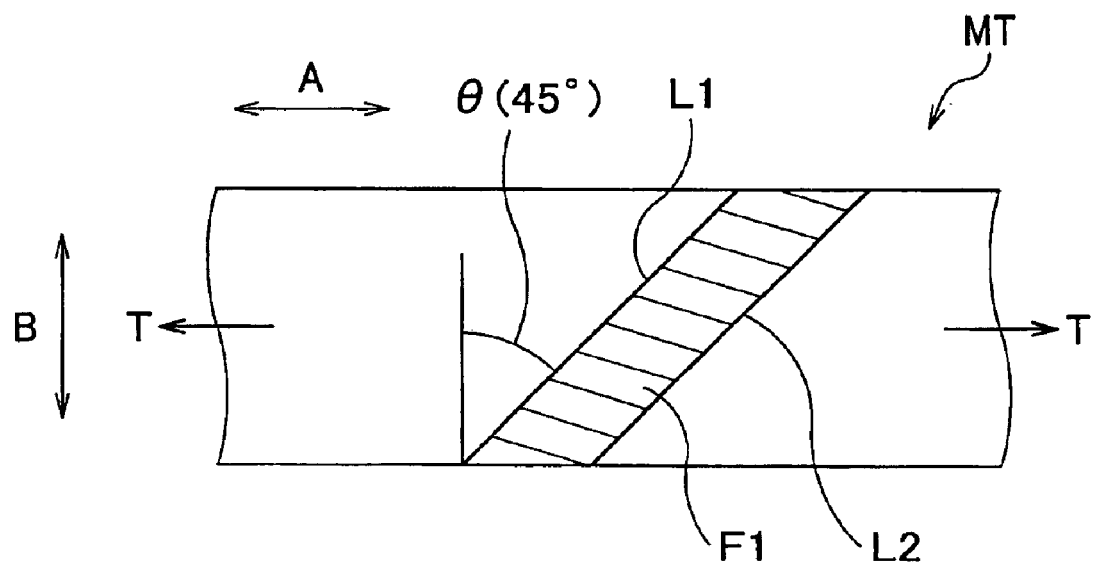
FIGS. 3A and 3B are plan views showing surfaces of magnetic tapes in which images F1 are formed.
Figure 3B:
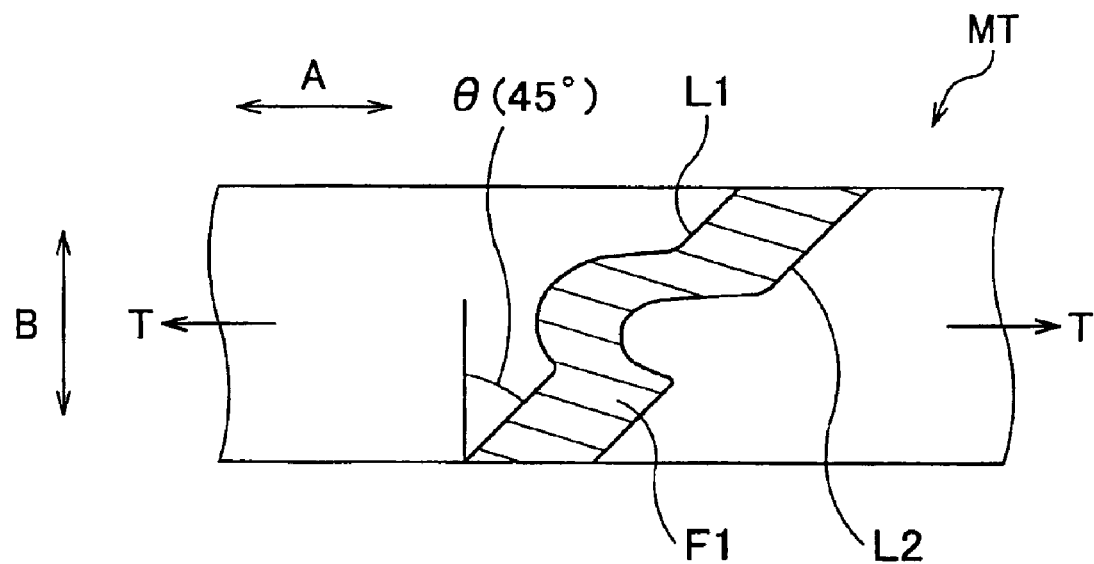
Figure 4:
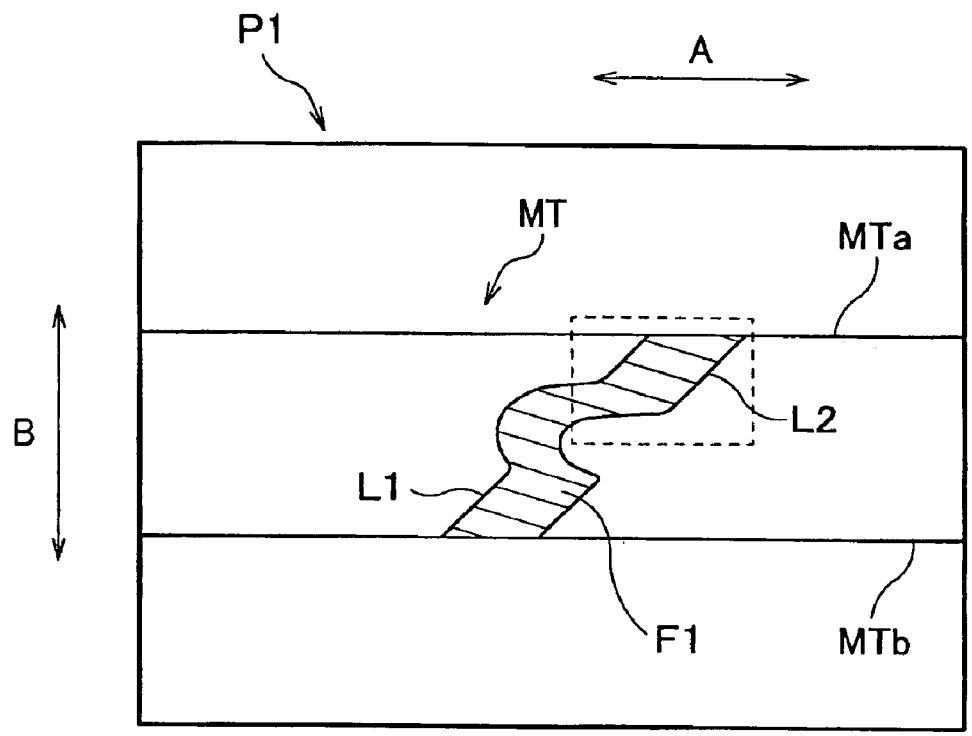
FIG. 4 is a drawing showing a screen image P1 which is a taken surface of the magnetic tape shown in FIG. 3B by an image taking device 14 included in the inspecting apparatus 10.
Figure 5:
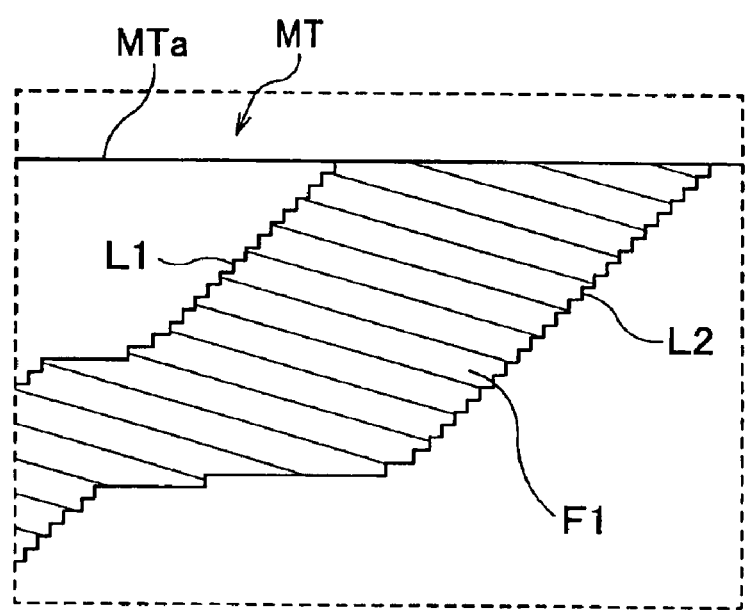
FIG. 5 is an illustration drawing which illustrates a method to investigate strain of a magnetic tape MT from the screen image P1 shown in FIG. 4.

Firstly, a case in which surface strain of a magnetic tape pulled out from a cartridge case of a magnetic tape cartridge is measured is described referring to FIGS. 1 to 5. Meanwhile, FIG. 5 shows a portion of FIG. 4 enclosed with broken lines by enlarging it. FIGS. 3A, 3B, and 4 are indicated so that left/right directions in the drawings become running directions A.

Figure 1:
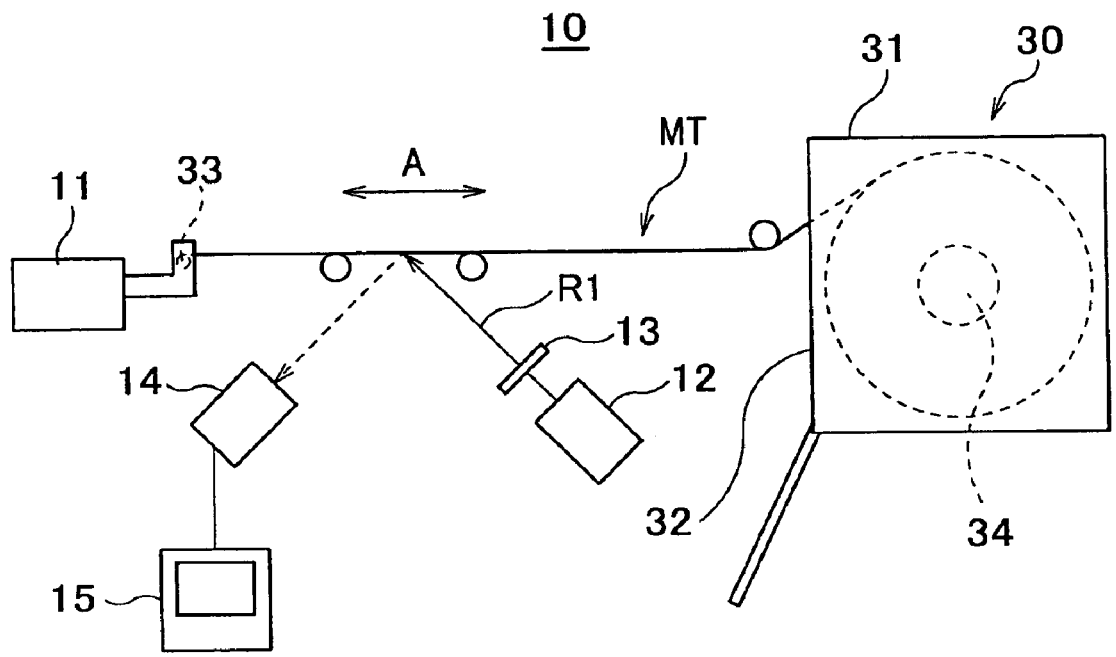
FIG. 1 is a plan view showing a configuration of a magnetic tape surface strain inspecting apparatus 10 related to a first embodiment.

As shown in FIG. 1, a magnetic tape surface strain inspecting apparatus (hereinafter simply referred to as "surface strain inspecting apparatus") 10 related to the invention is composed of a magnetic tape pulling-out mechanism (hereinafter simply referred to as "pulling-out mechanism") 11, a light emitting device 12, a light shielding plate 13, an image taking device 14, and a computer 15. Meanwhile, the computer 15 corresponds to an "image inspecting means" and a "strain discriminating means" in claims of the invention. Below, each component of the surface strain inspecting apparatus 10 is described in detail.

When the surface strain of the magnetic tape MT is inspected (hereinafter simply referred to as "in inspection"), the pulling-out mechanism 11 pulls out a constant length of the tape MT from an opening 32 of cartridge case 31 of a magnetic tape cartridge 30 (see FIG. 1).

After the constant length of the tape MT is pulled out from the cartridge case 31 by the pulling-out mechanism 11, a reel 34 in which the tape MT is wound is fixed by a friction force, magnetic force, and the like, thereby giving constant tension between both ends of the tape MT (see FIG. 3A). In the embodiment, the tape MT is given 0.1 N in tension. A reason why the constant tension is given between both ends of the tape MT is to restrain its curl produced by a difference of stress between a magnetic layer and back layer.

The light emitting device 12 is composed so as to collect lights emitted from a light source by a lens and the like and to emit them in one direction, and the shielding plate 13 is placed at a side of light emitting plane 12a of the light emitting device 12 (see FIG. 2). In the shielding plate 13, as shown in FIG. 2, a slit 13a slanting at an angle θ for tape width directions B (see FIG. 3A) of the tape MT is formed and it passes only lights R1 out of emitted lights. In the embodiment, the slit 13a is formed slanting at 45 degrees for the tape width directions B of the tape MT. Meanwhile, a slit width and length of the slit 13a are determined as appropriately corresponding to a distance between the light emitting device 12 and tape MT, a tape width of the tape MT, and the like.

Thus, by placing the shielding plate 13 at the side of light emitting plane 12a of the light emitting device 12, a linear image F1 slanting at the angle θ (45 degrees) for the tape width directions B of the tape MT can be formed on its surface (see FIG. 3A).

Then, if there exists a thickness fluctuation of the tape MT, convexity and concavity, and/or damage on its surface, a left edge L1 and right edge L2 of the image F1 positioned at a place at which the thickness fluctuation, convexity and concavity, damage, or the like exists are displaced in the running directions A of the tape MT (see FIG. 3B). This is because the lights R1 emitted on the surface of the tape MT from the light emitting device 12 are diffusely reflected due to its thickness fluctuation, convexity and concavity, and/or damage.

In an example shown in FIG. 3B, the left edge L1 and right edge L2 of the image F1 are largely displaced toward left in the drawing near a center in the tape width directions B of the tape MT. Meanwhile, the invention calls the thickness fluctuation of the tape MT, convexity and concavity, and damage on its surface "strain" or "surface strain."

Here, a reason for forming the linear image F1 which slants at the angle θ for the tape width directions B of the tape MT is because it is easier to do so than to form a linear image in the tape width directions B of the tape MT, in order to discriminate displacement toward the running directions A of the tape MT at the left edge L1 and right edge L2 of the image F1 derived from its surface strain. Meanwhile, if the displacement toward the running directions A of the tape MT at the left edge L1 and right edge L2 of the image F1 derived from its surface strain can be sufficiently discriminated, the angle θ is not limited to 45 degrees and may be set as appropriately.

The image taking device 14 takes the image F1 formed on the surface of the tape MT. In the embodiment, the CCD camera is used as the image taking device 14. A screen image P1 (see FIG. 4) inclusive of the image F1 taken by the CCD camera (image taking device) 14 is input in the computer 15 (see FIG. 1) connected with the camera 14.

Meanwhile, in the embodiment, the light emitting device 12 is arranged to emit the lights R1 at an angle of about 45 degrees so that the image F1 formed on the surface of the tape MT is high-sensitively taken by the camera 14 and largely transferred on the screen image P1 taken by the camera 14: the image taking device 14 is arranged so as to take the image F1 formed on the surface of the tape MT at the angle of about 45 degrees for its surface (see FIG. 1).

The computer 15 inspects the surface strain of the tape MT and obtains presence or absence of the strain and its largeness from displacement toward the running directions A of the tape MT at the left edge L1 and right edge L2 of the image F1 transferred on the screen image P1 (see FIG. 4) which is input from the camera 14. To be more precise, because the screen image P1 is composed of dots, the presence or absence of the strain and its largeness can be inspected by investigating how many dots the left edge L1 and right edge L2 of the image F1 are displaced by toward the running directions A of the tape MT. That is, when slants of the left edge L1 and right edge L2 of the image F1 are displaced from those of the light source, it can be judged that there exists the surface strain on the surface of the tape MT.

Explaining the screen image P1 shown in FIG. 4 as an example, in case that a total width of the tape MT is composed of 100 dots, the image F1 is formed slanting at an angle of 45 degrees for the tape width directions B of the tape MT, so, without strain on the surface of the tape MT, the left edge L1 and right edge L2 of the image F1 are displaced one dot by one dot toward the left in the drawing as they direct from an upper end MTa to lower end MTb (see FIG. 5). Thus, as shown in FIG. 5, when the left edge L1 and right edge L2 of the image F1 are displaced equal to one dot or more toward the left in the drawing, it can be judged that there exists the surface strain on the surface of the tape MT. Moreover, when the left edge L1 and right edge L2 of the image F1 are displaced toward right in the drawing and/or not displaced, it can also be judged that there exists the surface strain at the position. Then, the strain largeness can be obtained by investigating how many dots the left edge L1 and right edge L2 of the image F1 are displaced by toward the left in the drawing.

When only the presence or absence of the strain is wanted to be investigated, the displacement of dots at the left edge L1 and right edge L2 of the image F1 toward the running directions A of the tape MT is counted and the presence or absence of the strain can be investigated according to whether the counted value is 100 or more than 100. That is, when the counted value is more than 100, it can be judged that there exists the strain. As described before, this is based on the fact that without the strain on the surface of the tape MT, the left edge L1 and right edge L2 of the image F1 are displaced one dot by one dot toward the left in the drawing as they direct from the upper end MTa to the lower end MTb (see FIG. 5), if, for example, the total width of the tape MT is composed of 100 dots and the image F1 is formed slanting at the angle of 45 degrees for the tape width directions B of the tape MT.

When inspecting the surface strain of the tape MT by the surface strain inspecting apparatus 10 as composed above, firstly pull out a constant length of the tape MT from the opening 32 of cartridge case 31 of the magnetic tape cartridge 30 by the pulling-out mechanism 11 (see FIG. 1). After pulling out the tape MT, fix the reel 34 in which the tape MT is wound by a friction force, magnetic force, and the like, and give constant tension between both ends of the tape MT (see FIG. 3A).

Subsequently, emit the lights R1 on the surface of the tape MT from the light emitting device 12 (see FIG. 1) and form the linear image F1 slanting at the angle θ (45 degrees) for the tape width directions B of the tape MT on its surface (see FIG. 3A). Then, if there exists the thickness fluctuation of the tape MT, the lights R1 emitted on the surface of the tape MT from the light emitting device 12 are diffusely reflected due to its thickness fluctuation, convexity and concavity, and/or damage, whereby the left edge L1 and right edge L2 of the image F1 formed on the surface of the tape MT are displaced in the running directions A of the tape MT (see FIG. 3B).

Next, take the image F1 formed on the tape MT by the CCD camera (image taking device) 14. The screen image P1 (see FIG. 4) inclusive of the image F1 taken by the CCD camera 14 is input in the computer 15 connected with the camera 14.

Then, in the computer 15, inspect the presence or absence of the strain and its largeness from displacement toward the running directions A of the tape MT at the left edge L1 and right edge L2 of the image F1 transferred on the screen image P1 (see FIG. 4) which is input from the camera 14. To be more precise, because the screen image P1 is composed of dots, obtain the presence or absence of the strain and its largeness by investigating how many dots the left edge L1 and right edge L2 of the image F1 are displaced by toward the running directions A of the tape MT.

Thus, the surface strain inspecting apparatus 10 related to the first embodiment emits the lights R1 on the surface of the magnetic tape MT by the light emitting device 12, thereby forming the linear image F1 which slants at a predetermined angle for the tape width directions B of the tape MT, and takes the image F1 by the CCD camera 14, image taking device. Then, the surface strain inspecting apparatus 10 investigates the linearity of the left edge L1 and right edge L2 transferred on the taken image P1 by the computer 15, image inspecting means and discriminates the strain largeness on the surface of the tape based on the inspection result by the computer 15, strain discriminating means, whereby the surface strain inspecting apparatus 10 can inspect the surface strain of the magnetic tape MT.

b. Second Embodiment

Figure 7:
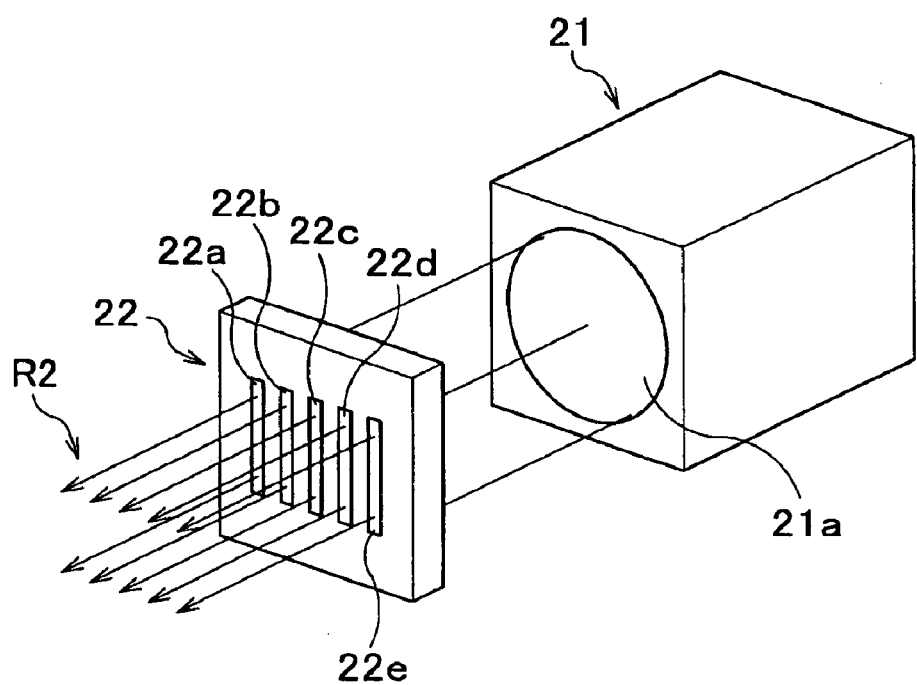
FIG. 7 is a perspective view showing a light emitting device 21 and light shielding plate 22 included in the inspecting apparatus 20.
Figure 8A:
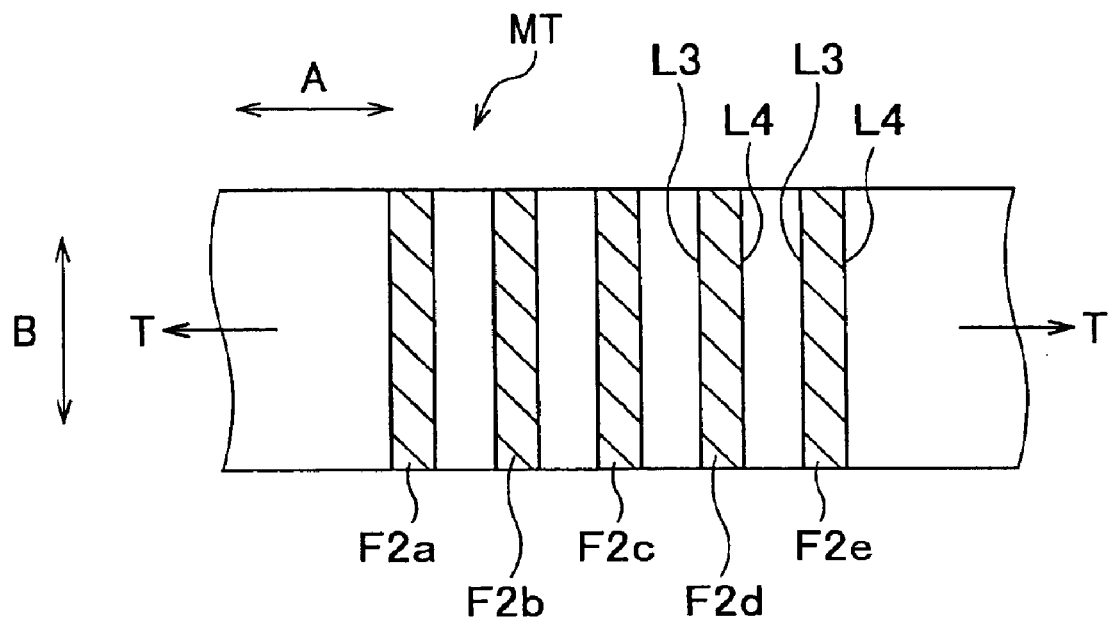
FIGS. 8A and 8B are plan views showing surfaces of magnetic tapes in which images F2 are formed.
Figure 8B:
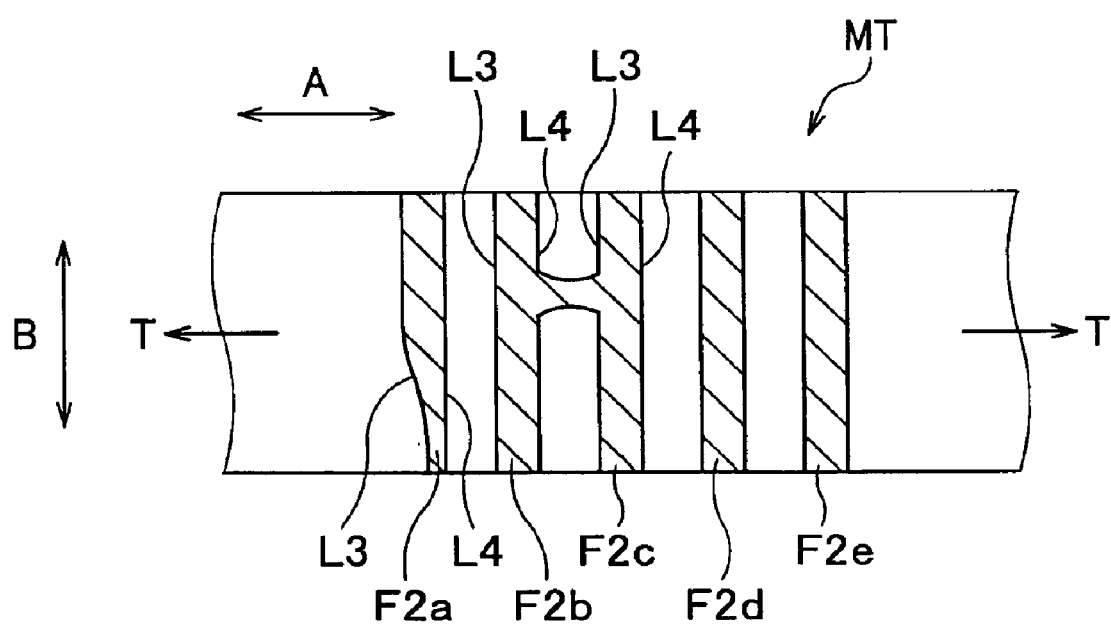
Figure 9:
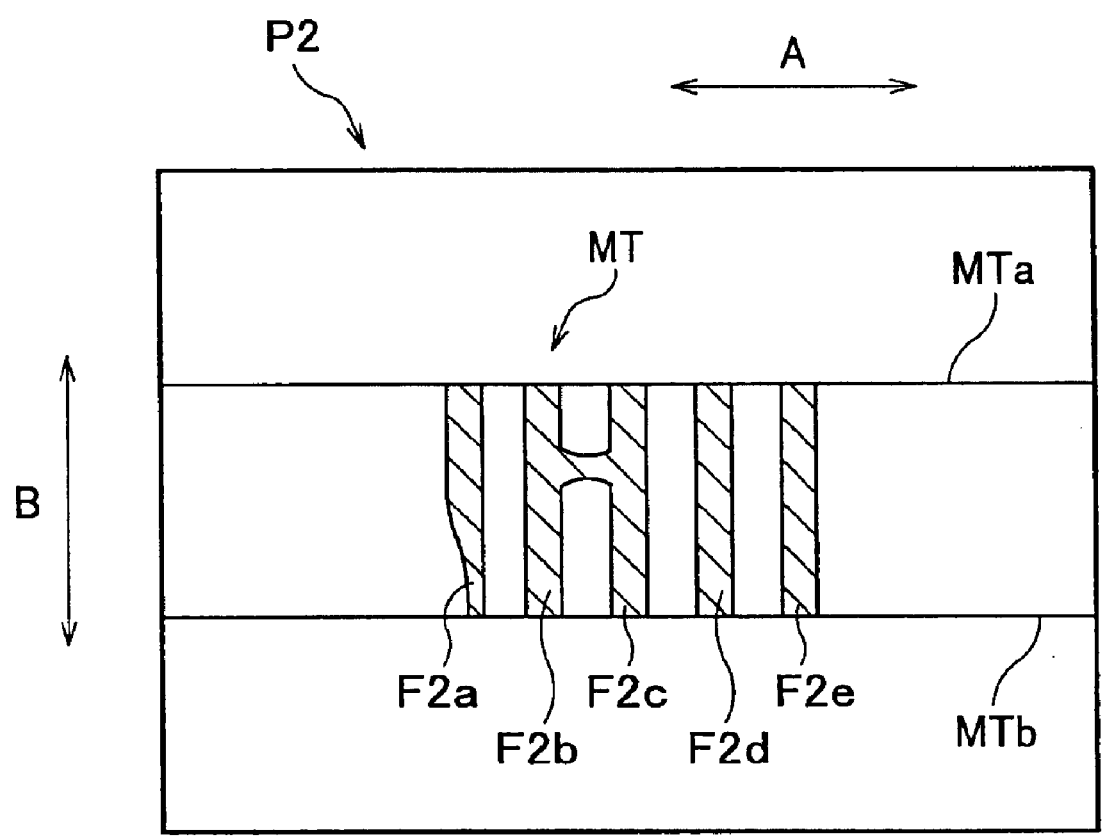
FIG. 9 is a drawing showing an image P2 which is the taken surface of the magnetic tape shown in FIG. 8B taken by an image taking device 23 included in the inspecting apparatus 20.

Next, a case in which a surface strain of the magnetic tape wound in a tape reel housed in a magnetic tape cartridge is measured is described referring to FIGS. 6 to 10. Meanwhile, FIGS. 8A, 8B, and 9 are indicated so that left/right directions in the drawings become running directions A.

Figure 6:
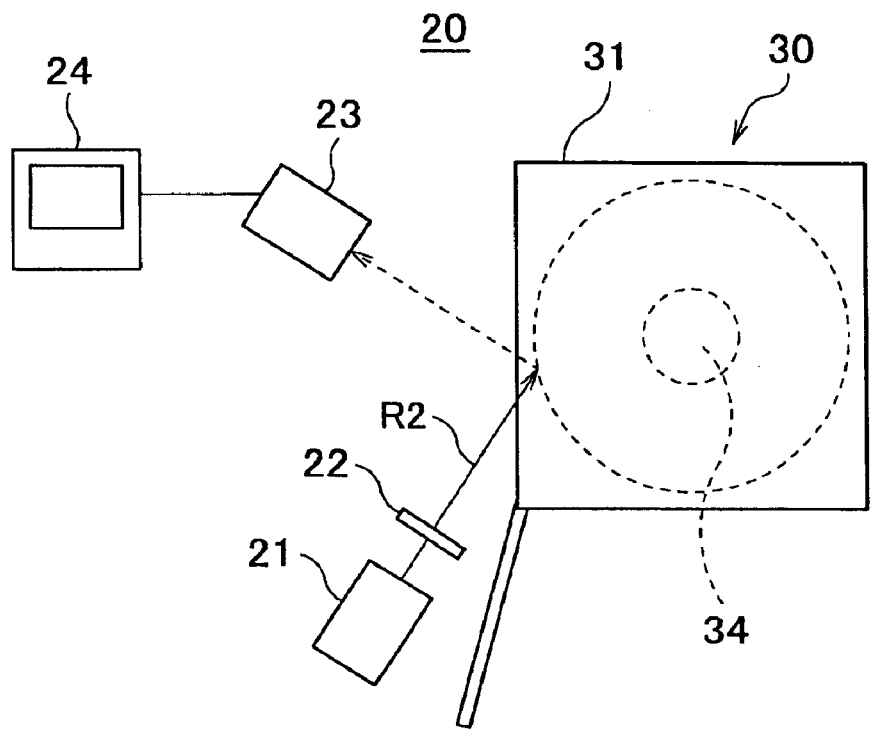
FIG. 6 is a plan view showing a configuration of a magnetic tape surface strain inspecting apparatus 20 related to a second embodiment.

As shown in FIG. 6, a magnetic tape surface strain inspecting apparatus (hereinafter simply referred to as "surface strain inspecting apparatus") 20 related to the invention is composed of a light emitting device 21, a light shielding plate 22, an image taking device 23, and a computer 24. Meanwhile, the computer 24 corresponds to an "image inspecting means" and a "strain discriminating means." in claims of the invention. Below, each component of the surface strain inspecting apparatus 20 is described in detail.

The light emitting device 21 is composed so as to collect lights emitted from a light source by a lens and the like and to emit them in one direction, and the shielding plate 22 is placed at a side of light emitting plane 21a of the light emitting device 21 (see FIG. 7). In the shielding plate 22, as shown in FIG. 7, five slits 22a, 22b, 22c, 22d, and 22e which parallel extend to a tape width directions B (see FIG. 8A) of the magnetic tape MT are formed and these slits pass only lights R2 out of emitted lights. Meanwhile, these slit widths and lengths are determined as appropriately corresponding to a distance between the light emitting device 21 and tape MT, a tape width of the tape MT, and the like.

Thus, by placing the shielding plate 22 at the side of light emitting plane 21a of the light emitting device 21, the lights R2 can be emitted on a surface of the tape MT from the light emitting device 21 (see FIG. 6) and the linear images F2a, F2b, F2c, F2d, and F2e can be formed in the tape width directions B of the tape MT on its surface (see FIG. 8A). In FIG. 8A, the images F2a, F2b, F2c, F2d, and F2e are linearly formed in the tape width directions B of the tape MT from left in turn in the drawing.

Then, if there exists a thickness fluctuation of the tape MT, convexity and concavity, and/or damage on its surface, a part of left edge L3 and right edge L4 of the images F2 positioned at places at which the thickness fluctuation, convexity and concavity, damage, or the like exists is displaced in the running directions A of the tape MT, thereby a part or all of widths of the images F vary (see FIG. 8B). This is because the lights R2 emitted on the surface of the tape MT from the light emitting device 21 are diffusely reflected due to its thickness fluctuation, convexity and concavity, and/or damage.

Meanwhile, although the embodiment is composed so that the five images F2a, F2b, F2c, F2d, and F2e are formed on the surface of the tape MT, a number of the images F formed on the surface of the tape MT is not specifically limited.

In an example shown in FIG. 8B, a part of left edge L3 of the image F2a is displaced toward right in the drawing near a lower end MTb in the tape width directions B of the tape MT. Moreover, a part of right edge L4 of the image F2b is displaced toward the right in the drawing near an upper end MTa in the tape width directions B of the tape MT, a part of the left edge L3 of the image F2c is displaced toward left in the drawing near the upper end MTa in the tape width directions B of the tape MT, and a part of right edge L4 of the image F2b and a part of left edge L3 of the image F2c are in a connected state.

The image taking device 23 takes the images F2 formed on the surface of the tape MT. In the embodiment, a CCD camera is used as the image taking device 23. A screen image P2 (see FIG. 9) taken by the CCD camera (image taking device) 23 is input in the computer 24 (see FIG. 9) connected with the camera 23.

Meanwhile, in the embodiment, the light emitting device 21 is arranged to emit the lights R2 at an angle of about 45 degrees so that the images F2 formed on the surface of the tape MT are high-sensitively taken by the camera 23 and largely transferred on the screen image P2 taken by the camera 23: the image taking device 23 is arranged so as to take the images F2 formed on the surface of the tape MT at the angle of about 45 degrees for its surface (see FIG. 6).

The computer 24 inspects the surface strain of the tape MT and obtains presence or absence of the strain and its largeness by investigating displacement toward the running directions A of tape MT at the left edge L3 and right edge L4 of the images F2 transferred on the screen image P2 (see FIG. 9), which is input from the camera 23, and left/right symmetry of the images F2. To be more precise, because the screen image P2 is composed of dots, the presence or absence of the strain and its largeness can be inspected by investigating the displacement of the left edge L3 and right edge L4 of the images F2 toward the running directions A of the tape MT. In addition, after dividing the screen image P2 into two in left/right directions (here, the running directions A of the tape MT) of the images F2, the presence or absence of the strain and its degree can be investigated by comparing the left/right symmetry of the images F2. That is, when slants of the left edge L3 and right edge L4 of the images F2 are displaced from those of the light source, it can be judged that there exists the surface strain on the surface of the tape MT.

Figure 10A:
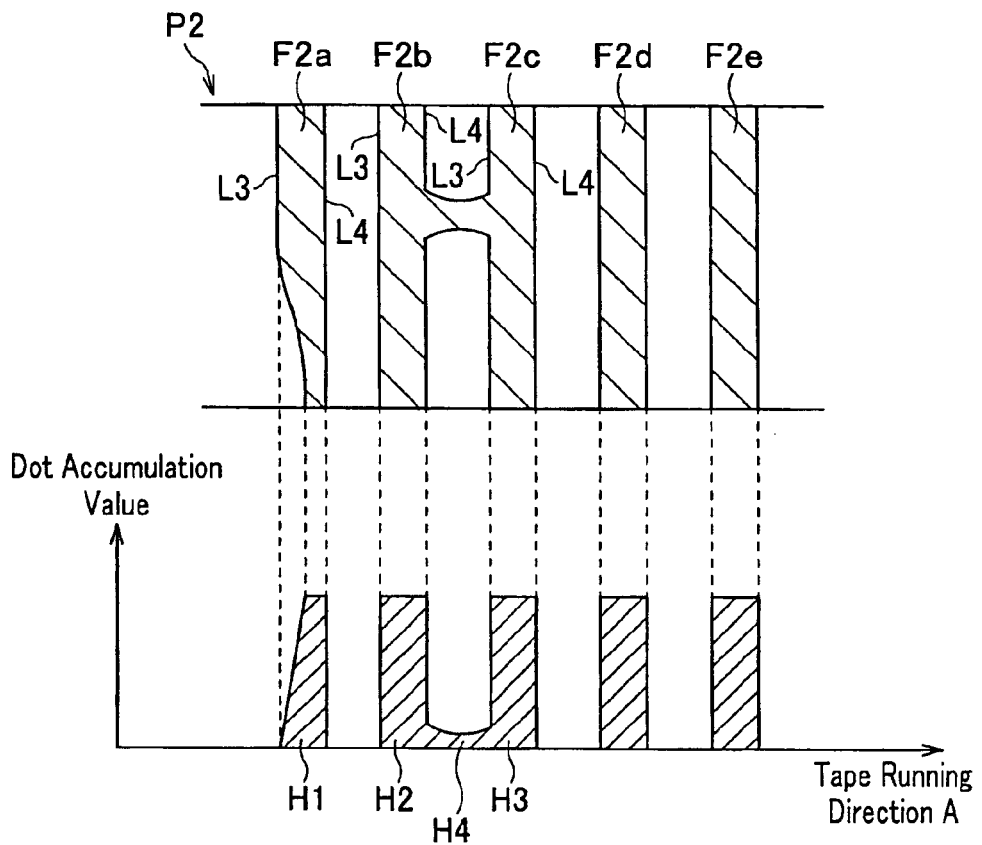
FIGS. 10A and 10B are illustration drawings which illustrate a method to investigate strain of the magnetic tape MT from the screen image P2 shown in FIG. 9.

Explaining the screen image P2 shown in FIG. 9 as an example, firstly as shown in FIG. 10A, the presence or absence of displacement of the left edge L3 and right edge L4 of each image F2 can be investigated by obtaining a dot accumulation of each image F2 and making its histogram. To be more precise, in a portion which corresponds to each image F2 in the histogram and in which a dot accumulation value is decreased less than a predetermined value, the left edge L3 or right edge L4 of the images F2 can be judged to be displaced toward the tape running directions A. Moreover, when the dot accumulation value exists between respective portions corresponding to respective images F2 in the histogram, a part of neighboring images F2 in the portions can be judged to be in a connected state.

In FIG. 10A, a dot accumulation value is decreased less than a predetermined value at left of a portion H1 corresponding to the image F2a in the histogram, so a part of left edge L3 of the image F2a can be judged to be displaced to the right of the drawing. Moreover, a dot accumulation value exists in a portion H4 between a portion H2 corresponding to the image F2b and a portion H3 corresponding to the image F2c, so a part of right edge L4 of the image F2b and a part of left edge L3 of the image F2c can be judged to be in a connected state.

Then, as shown in FIG. 10, after dividing the screen image P2 into two in the left/right directions (here, the running directions A of the tape MT) of each image F2, the presence or absence of the strain and its degree can be investigated by making histograms with obtaining the dot accumulation value of each the image F2 and comparing the left/right symmetry of the made histograms. To be more precise, in the portions of the histograms in which the dot accumulation values are decreased less than predetermined values, the left edge L3 or right edge L4 of a certain image F2 can be judge to be displaced to left or right. Moreover, in the portions of the histograms in which the dot accumulation values are increased more than predetermined values, a part of neighboring images F2 can be judged to be in a connected state.

Figure 10B:
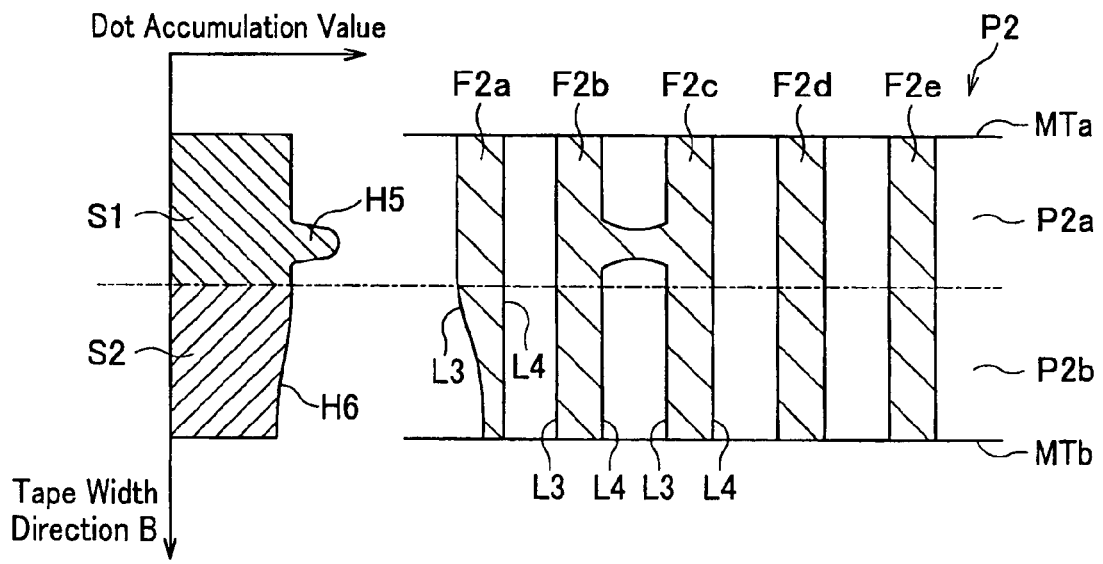

In FIG. 10B, because a dot accumulation value is increased in a portion H5 corresponding to near the upper end MTa of the tape MT in the histogram, a part of neighboring images F2 in the portion H5 can be judged to be in a connected state. Moreover, because a dot accumulation value is decreased in a portion H6, the left edge L3 or right edge L4 of a certain image F2 can be judge in the portion H6 to be displaced to the running directions A of the tape MT.

Then, the presence or absence of the strain and its degree can be investigated by comparing a symmetry of a histogram S1 of an image P2a and a histogram S2 of an image P2b which are divided into two from the image P2 in the left/right directions of each the image F2. To be more precise, obtaining a difference between an area of the histogram S1 in the image 2Pa and an area of the histogram S2 in the image 2Pb, if the difference does not exceed a value determined in advance, the histogram S1 in the image 2Pa and the histogram S2 in the image 2Pb are judged to be symmetric; and if the difference exceeds the value determined in advance, the histogram S1 in the image P2a and the histogram S2 in the image P2b are judged not to be symmetric.

When inspecting the surface strain of the tape MT by the surface strain inspecting apparatus 20 as composed above, firstly emit the lights R2 from the light emitting device 21 (see FIG. 6), and form the linear images F2a to F2e on the surface of the magnetic tape MT in the tape width directions B (see FIG. 8). Then, if there exists the thickness fluctuation of the tape MT, convexity and concavity, and/or damage on its surface, the lights R2 emitted on the surface of the tape MT from the light emitting device 21 are diffusely reflected due to its thickness fluctuation, convexity and concavity, and/or damage, whereby a part of the left edge L3 and right edge L3 of the images F2 formed on the surface of the tape MT are displaced in the running directions A of the tape MT and a part or all of widths of the images F2 vary (see FIG. 8B).

Subsequently, take the images F2 formed on the tape MT by the CCD camera (image taking device) 23. The screen image P2 (see FIG. 8) taken by the CCD camera 23 is input in the computer 24 connected with the camera 23.

Then, in the computer 24, obtain the presence or absence of the strain and its largeness from displacement toward the running directions A of the tape MT at the left edge L3 and right edge L4 of the images F2 transferred on the screen image P2 (see FIG. 9) which is input from the camera 23. To be more precise, because the screen image P2 is composed of dots, inspect the presence or absence of the strain and its largeness by investigating the displacement toward the running directions A of the tape MT at the left edge L3 and right edge L4 of the images F2. Moreover, after dividing the screen image P2 into two in the left/right directions (here, the running directions A of the tape MT) of each image F2, investigate the presence or absence of the strain and its degree by comparing the left/right symmetry of the images F2.

Thus, the surface strain inspecting apparatus 20 related to the second embodiment emits the lights R2 on the surface of the magnetic tape MT by the light emitting device 21, thereby forming the linear images F2a to F2e, and takes the images F2a to F2e by the CCD camera 23, image taking device. Then, the surface strain inspecting apparatus 20 investigates the linearity of the left edge L3 and right edge L4 transferred on the taken image P2 by the computer 24, image inspecting means, and discriminates the strain largeness on the surface of the tape based on the inspection result by the computer 24, strain discriminating means, whereby the surface strain inspecting apparatus 20 can inspect the surface strain of the magnetic tape MT.

Thus, although the embodiments of the present invention are described, the invention is not limited to the embodiments and various variations are possible as far as technical ideas are based on those of the invention.

Although in the second embodiment, as shown in FIG. 8A, the images F2a to F2e are formed in the width directions B of the magnetic tape MT, the images F2 can also be formed in the running directions A of the tape MT.

Furthermore, although the first and second embodiments make their inspection objective as the magnetic tape MT, other tape forms such as an optical recording tape are applicable.

What is claimed is:

1. A tape surface strain inspecting apparatus which optically inspects a surface of a tape and surface strain of said tape, the apparatus comprising:
    a light emitting device emitting a light on the surface of said tape and forming a linear image which slants at a predetermined angle for a tape width direction of said tape;
    an image taking device taking said image formed on the surface of the tape;
    an image inspecting means investigating an edge linearity of an image taken by said image taking device; and
    a strain discriminating means discriminating largeness of surface strain of said tape based on an inspection result by said image inspecting means.

2. A tape surface strain inspecting apparatus which optically inspects a surface of a tape and surface strain of said tape, the apparatus comprising:
    a light emitting device emitting a light on the surface of said tape and forming a linear image which slants at a predetermined angle for a tape width direction of said tape;
    an image taking device taking said image formed on the surface of the tape;
    an image inspecting means investigating an edge linearity of each image transferred on a screen image taken by said image taking device; and
    a strain discriminating means discriminating largeness of surface strain of said tape based on an inspection result by said image inspecting means.

3. A tape surface strain inspecting apparatus according to claim 1, which, when taking said image formed on a surface of said tape, has tape tension giving constant tension in a longitudinal direction of said tape.

4. A tape surface strain inspecting apparatus according to claim 2, which, when taking said image formed on a surface of said tape, has tape tension giving constant tension in a longitudinal direction of said tape.

5. A tape surface strain inspecting apparatus according to claim 1, wherein an angle for a tape width direction of said tape is 45 degrees.

6. A tape surface strain inspecting apparatus according to claim 3, wherein an angle for a tape width direction of said tape is 45 degrees.

7. A tape surface strain inspecting apparatus according to claim 2, wherein said images are five pieces.

8. A tape surface strain inspecting apparatus according to claim 4, wherein said images are five pieces.

9. A tape surface strain inspecting apparatus according to claim 1, wherein said tape is a magnetic tape.

10. A tape surface strain inspecting apparatus according to claim 2, wherein said tape is a magnetic tape.

11. A tape surface strain inspecting apparatus according to claim 3, wherein said tape is a magnetic tape.

12. A tape surface strain inspecting apparatus according to claim 4, wherein said tape is a magnetic tape.

13. A tape surface strain inspecting apparatus according to claim 5, wherein said tape is a magnetic tape.

14. A tape surface strain inspecting apparatus according to claim 7, wherein said tape is a magnetic tape.

15. A tape surface strain inspecting apparatus according to claim 1, wherein said tape is an optical recording tape.

16. A tape surface strain inspecting apparatus according to claim 2, wherein said tape is an optical recording tape.

17. A tape surface strain inspecting apparatus according to claim 3, wherein said tape is an optical recording tape.

18. A tape surface strain inspecting apparatus according to claim 4, wherein said tape is an optical recording tape.

19. A tape surface strain inspecting apparatus according to claim 5, wherein said tape is an optical recording tape.

20. A tape surface strain inspecting apparatus according to claim 7, wherein said tape is an optical recording tape.

* * * * *